United States Patent
Lee et al.

(10) Patent No.: US 12,473,079 B2
(45) Date of Patent: Nov. 18, 2025

(54) WINGTIP SHIELD

(71) Applicants: Shiang Yu Lee, Seattle, WA (US);
Dylan H. Lee, New York, NY (US)

(72) Inventors: Shiang Yu Lee, Seattle, WA (US);
Dylan H. Lee, New York, NY (US)

(73) Assignee: Shiang Yu Lee, Seattle, WA (US)

( * ) Notice: Subject to any disclaimer, the term of this patent is extended or adjusted under 35 U.S.C. 154(b) by 0 days.

(21) Appl. No.: 19/247,093

(22) Filed: Jun. 24, 2025

(65) Prior Publication Data
US 2025/0319961 A1    Oct. 16, 2025

Related U.S. Application Data

(62) Division of application No. 18/526,021, filed on Dec. 1, 2023, now Pat. No. 12,365,449.

(51) Int. Cl.
*B64C 23/06*    (2006.01)
*B64C 11/20*    (2006.01)
*F03D 1/06*    (2006.01)

(52) U.S. Cl.
CPC .......... *B64C 23/069* (2017.05); *B64C 11/205* (2013.01); *F03D 1/0687* (2023.08)

(58) Field of Classification Search
CPC ...... B64C 23/069; B64C 11/18; F03D 1/0687
See application file for complete search history.

(56) References Cited

U.S. PATENT DOCUMENTS

| | | | |
|---|---|---|---|
| 994,968 A | 6/1911 | Barbaudy et al. | |
| 3,974,986 A | 8/1976 | Johnstone et al. | |
| 4,382,569 A | 5/1983 | Boppe et al. | |
| 5,102,068 A | 4/1992 | Gratzer et al. | |
| 5,158,251 A | 10/1992 | Taylor et al. | |
| 5,634,613 A | 6/1997 | McCarthy et al. | |
| 6,474,604 B1 | 11/2002 | Carlow et al. | |
| 6,892,988 B2 | 5/2005 | Hugues et al. | |
| 7,207,526 B2 | 4/2007 | McCarthy et al. | |
| 7,246,998 B2 | 7/2007 | Kovalsky et al. | |
| 7,270,214 B1 | 9/2007 | Tonnessen et al. | |
| 8,366,056 B2 | 2/2013 | Garang et al. | |
| 8,490,925 B2 | 7/2013 | Buescher et al. | |
| 8,651,427 B1 | 2/2014 | Malachowski et al. | |
| 10,690,112 B2 | 6/2020 | Keeley et al. | |
| 10,836,466 B2 | 11/2020 | Sebastian et al. | |

(Continued)

OTHER PUBLICATIONS

Partial European Search Report received from Associate on Apr. 3, 2025 for European Patent Application No. 24216208.9, filed Nov. 28, 2024; 14 pages total.

(Continued)

*Primary Examiner* — Joshua D Huson
*Assistant Examiner* — Anna L. Gordon
(74) *Attorney, Agent, or Firm* — Christensen O'Connor Johnson Kindness PLLC

(57) ABSTRACT

Wingtip shields are described. In one embodiment, a wingtip shield includes an inner surface facing a high-pressure side of an airfoil. The airfoil is attached to the main body. The wingtip shield also includes an outer surface configured opposite from the inner surface. The wingtip shield is attachable to the airfoil along a peripheral edge of the airfoil from a first point of a leading edge of the airfoil to a second point of a trailing edge of the airfoil. A first span distance from the first point at the leading edge to the main body is less than a second span distance of the second point at the trailing edge to the main body.

9 Claims, 14 Drawing Sheets

(56) References Cited

U.S. PATENT DOCUMENTS

| | | |
|---|---|---|
| 10,919,618 B2 | 2/2021 | Smith et al. |
| 2009/0224107 A1 | 9/2009 | McLean |
| 2011/0070090 A1 | 3/2011 | Hugues et al. |
| 2011/0260008 A1 | 10/2011 | Smith et al. |
| 2012/0091262 A1 | 4/2012 | Rawdon et al. |
| 2012/0312928 A1 | 12/2012 | Gratzer et al. |
| 2016/0009378 A1 | 1/2016 | Guida et al. |
| 2020/0010173 A1 | 1/2020 | Scully et al. |
| 2022/0024564 A1 | 1/2022 | Cosentino et al. |
| 2022/0135195 A1 | 5/2022 | Sharrow et al. |

OTHER PUBLICATIONS

Extended European Search Report received from Associate on Jul. 1, 2025 for European Patent Application No. 24216208.9, filed Nov. 28, 2024; 11 pages total.

WINGTIP SHIELD

CROSS-REFERENCE TO RELATED APPLICATIONS

This application is a divisional of U.S. application Ser. No. 18/526,021, filed Dec. 1, 2023, the entire disclosure of which is hereby incorporated by reference in its entirety for all purposes.

BACKGROUND OF THE INVENTION

When an airplane flies, a high pressure builds up on the bottom surface of the airplane wings, as the velocity of the air is converted into pressure. If the flight speed is high, the pressure at the bottom surface of the wings can also be high. This pressure is rather uniform all over the wing lower surface except near the wing tip where the pressure falls off. The pressure generated by the air velocity can be expressed as $$Q = \frac{1}{2}\rho v^2,$$

where Q is the dynamic pressure, p is a density of air, and v is the velocity of air.

On the other hand, the upper surface of the wing is characterized by a negative relative pressure (when compared to ambient pressure). This negative pressure is distributed with a peak close to the front of the wing and could reach as high as three times the dynamic pressure (−3Q). With such great pressure differences, the air near the wingtip is naturally coerced to flow from the bottom to the top thereby creating a vortex flow, commonly called the "trailing vortices." These vortices are continuously generated so there is a growing column of air turning rotational behind the wingtips. This situation requires a continuous supply and consumption of energy into the stream. The force sustaining this phenomenon is called "lift induced drag," which is overcome by the thrust force of the airplane engines.

It is known that, theoretically speaking, if we can build a wing of infinite span there will not be any induced drag and flying could be cost free. That is of course impossible to achieve. However, a very long and slim wing performs much better than the short one. For example, a good glider typically has a glide ratio of up to 70/1 as compared to a glide ratio of commercial transport plane of 20/1. Glide ratio is a measure of how far an airplane can fly before touching ground without any power supply. This ratio is also equivalent to lift to drag ratio, dictating the thrust requirement of an airplane in the cruise phase of flight.

Conventional technologies rely on extending the wingspan or applying "winglets" at the wingtips to make improvements regarding the lift to drag ratio. These solutions, however, do not change the basic mode of operation of the wing, but instead only slightly increase the "aspect ratio" and therefore lift to drag ratio. Accordingly, system and methods are still needed for improved lift to drag ratio.

SUMMARY OF THE DISCLOSURE

It is well-established in aerodynamic theory that an airplane can fly because of the circulatory flow around the wing, which generates significant lifting force on the wing, the lifting force being much stronger than simply pushing the air downward. According to the Kelvin-Helmholtz theory, this circulatory flow must extend beyond the wing and form two trailing vortices behind the wing. These vortices continuously disturb air in the wake of the airplane and consume considerable energy in the process. Thus, the trailing vortices of an airplane wing are the primary cause of the "lift induced drag" on the wing. The wing tip vortices may also cause significant turbulence, causing potentially hazardous conditions to airplanes following in the flight path of the lead airplane. A common alternative description of the formation of the trailing vortices is that the lower side of the wing maintains a higher pressure while the upper side pressure is at a lower pressure. Consequently, the air flows around the wingtip, from the lower side to the top side, creating the vortices at the wingtip.

In some embodiments of the present inventive technology, a physical obstruction at the wingtip area is provided between the high-pressure region (lower side of the wing) and the low-pressure region (upper side of the wing) to prevent or reduce the air flow from the lower side of the wing to the upper side of the wing, thus preventing or significantly reducing the formation of the trailing vortices. The upper surface of the obstruction is facing in the inboard and backward (downstream) direction. This obstruction (also referred to as "a wingtip shield" or "an airfoil tip structure") may be formed at the high-pressure side of the wing (airfoil) to re-direct the airflow from the high-pressure region toward the rear, or down-stream direction. In so doing, a net thrust force is gained acting on the wingtip shield.

In other embodiments, the wingtip shield may be placed to project up on top of the wingtip, with the bottom surface of the shield facing in the inboard and forward direction. The wingtip shield of this embodiment is referred to as a reversed wingtip shield. The positioning of the reversed wingtip shield generates a separation vortex on top of the shield. The vortex circulation direction is in a reverse direction when compared to the common wing vortex, therefore providing an updraft wind to the inboard side of the wing, instead of the typical downdraft of the conventional wingtip. In some embodiments, the reversed wingtip shield is used on a propeller or a wind turbine blade, where the oppositely rotating wing vortices provide benefit to the next rotating blade, in turn improving the efficiency of the rotating machinery (e.g., fan, propeller, wind turbine, helicopter rotor, etc.).

BRIEF DESCRIPTION OF DRAWINGS

Non-limiting and non-exhaustive embodiments of the present invention are described with reference to the following figures, wherein like reference numerals refer to like parts throughout the various views unless otherwise specified. Corresponding reference characters indicate corresponding components throughout the several views of the figures.

DETAILED DESCRIPTION

Figure 1:
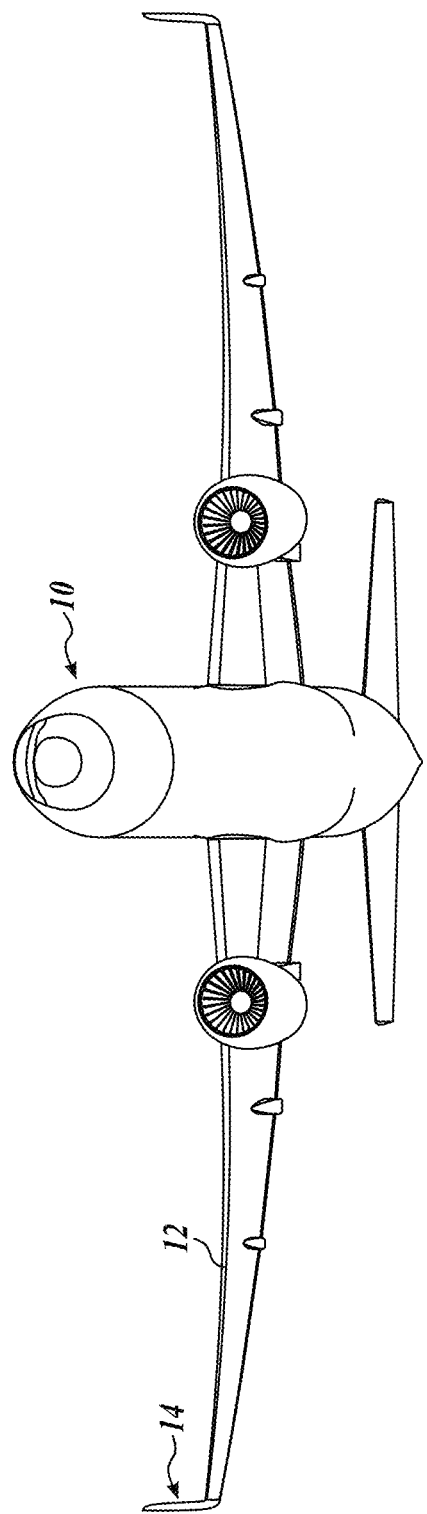
FIG. 1 illustrates an aircraft having winglets in accordance with conventional technology.

FIG. 1 illustrates an aircraft 10 having winglets 14 in accordance with conventional technology. High pressure on the lower surface of the wing creates a natural airflow that makes its way to the wingtip and curls upward around it, thus creating a vortex. When flow around the wing streams out behind the airplane, a vortex is formed at the tip of the wing. These vortices cause energy losses by effectively increasing drag force of the wing.

With conventional technology, the winglets 14 are turned upwards and away from the low-pressure surface (upper surface) of the wing 12. In operation, the winglets 14 reduce strength of the vortices at the end of the airplane wings 12, therefore reducing the overall drag force of the wings themselves. In different conventional implementations, the conventional winglets may, in addition to extending upwards, also extend downwards, i.e., toward the high pressure surface of the wing, but always away from the tip of the wing in order to reduce strength of the vortices at the end of the wings 12.

Embodiment A—Wingtip Shield

Figure 2:
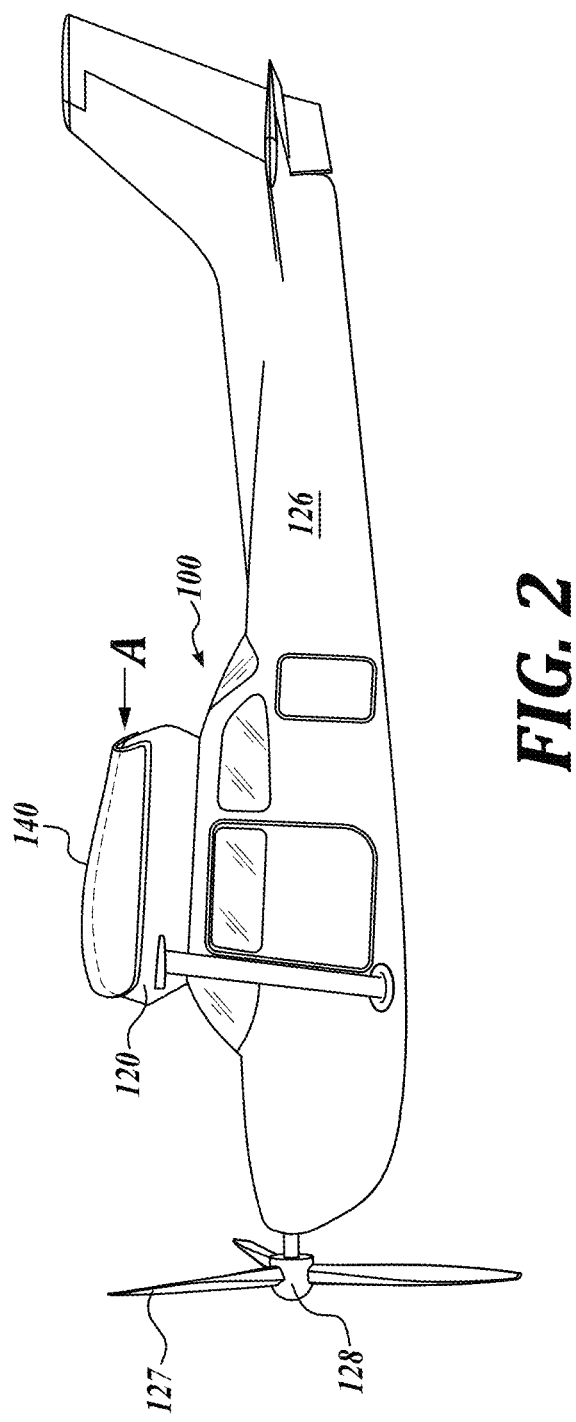
FIG. 2 is a side view of an aircraft having a wingtip shield in accordance with the teachings of the present disclosure.

FIG. 2 is a side view of an aircraft having a wingtip shield in accordance with the teachings of the present disclosure. In operation, the aircraft 100 travels in the direction A based on propulsion provided by a propeller 127 having a shaft 128. A wingtip shield 140 (also referred to as a airfoil tip structure 140) is attached at the end of the airfoil (wing) 120 which are attached to a fuselage 126. In different embodiments, the airplane 100 may be a jet plane, a glider, or other flying object having an airfoil (i.e., a wing) 120. In some embodiments, the propeller 127 may be a propeller of a helicopter, a gyrocopter or a wind turbine. Operation of the wingtip shield 140 is described with respect to FIGS. 3-6 below.

Figure 3:
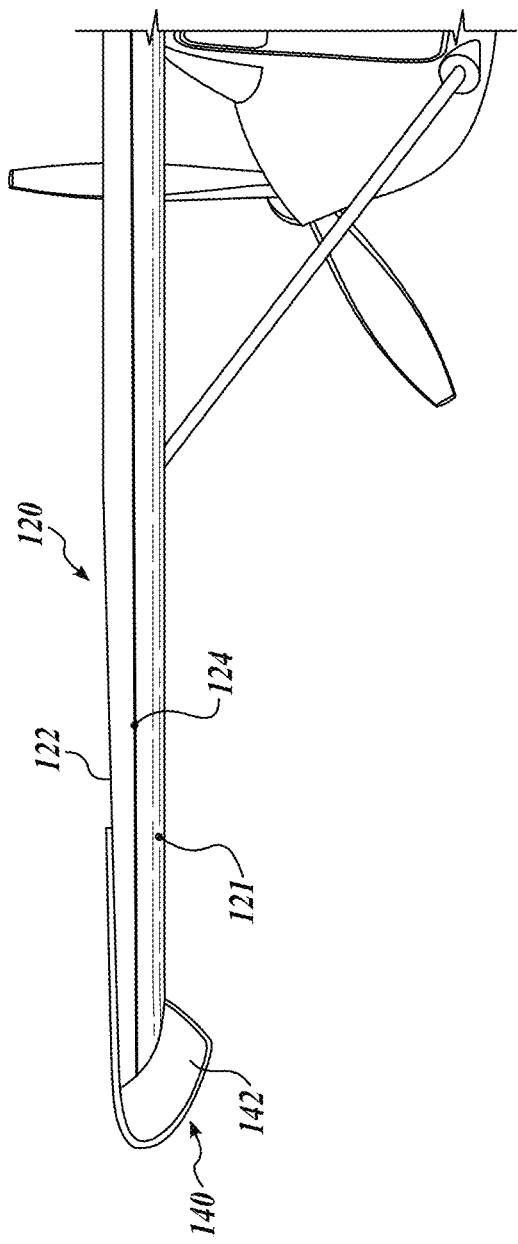
FIG. 3 is a view A of FIG. 2.

FIG. 3 is a view A of FIG. 2. The illustrated airplane is shown as flying into the plane of paper. The wing 120 is characterized by an upper (low pressure) surface 122 and a lower (high pressure) surface 121. The upper surface 122 and the lower surface 121 meet at a trailing edge 124 of the wing 120. The wingtip shield 140 is attached at the tip of the wing (airfoil) 120.

The wingtip shield 140 is attached to the wing 120 such that an inner surface 142 of the wingtip shield curves away from the lower surface 121 in the downstream direction and inwards toward the fuselage of the plane (and not away from the fuselage as with the conventional winglets). In different embodiments, the wingtip shield 140 may be attached to the wing by fasteners (e.g., screws or rivets), by welding, by adhesion (e.g., using glues or epoxies), or other attachment methods, which generally makes it easier to retrofit or redesign the existing wings 120. In other embodiments, the wingtip shield 140 may be manufactured to be integral with the wing 120.

Figure 4:
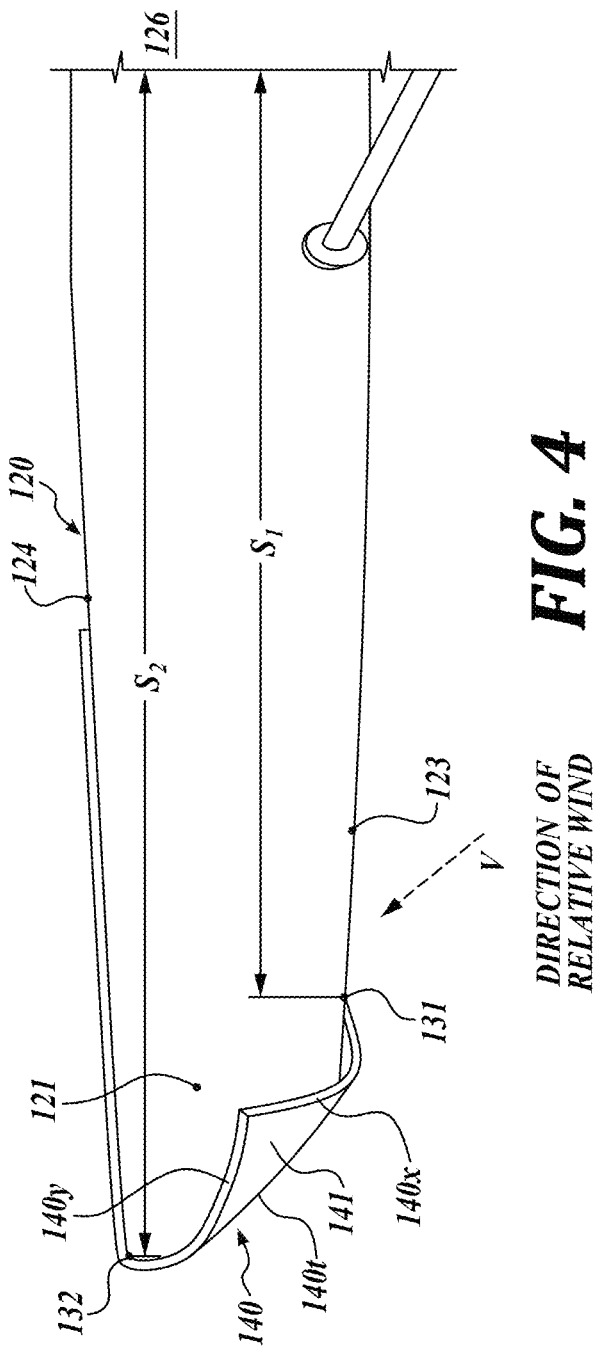
FIG. 4 is a partial back view of a wing of an aircraft in accordance with the teachings of the present disclosure.

FIG. 4 is a partial back view of a wing of an aircraft in accordance with the teachings of the present disclosure. The incoming air velocity (i.e., relative wind) V flows from the leading edge 123 of the wing 120 toward its trailing edge 124. In the context of this specification, the leading and trailing edges are interchangeably referred to as peripheral edges. The wingtip shield 140 curves from the tip of the wing 120 toward the fuselage (also referred to as the main body) and away from the low pressure surface 122 into the downstream direction. In some embodiments, the wingtip shield 140 is joined with the wing 120 along a line starting from about the tip of the wing and extending for a certain distance along the leading edge 123, that is, along the edge 140t toward the fuselage of the aircraft. The connecting line 140t to the wing tip is swept inboard starting from the trailing edge 124 of the wing tip. The free edges of the wingtip shield 140 are marked as 140x (generally in the x direction) and 140y (generally in the y direction). The outer surface 141 of the wingtip shield 140 faces away from the low pressure surface 122 of the wing. Looking at the attachment of the wingtip shield 140 to the wing (airfoil) 120, the attachment of the wingtip shield 140 to the airfoil 120 may be described as extending from a first point 131 of a leading edge 123 of the airfoil to a second point 132 of a trailing edge 124 of the airfoil, and wherein a first span distance S1 from the first point at the leading edge 123 to the main body (fuselage) is less than a second span distance S2 of the second point at the trailing edge 124 to the main body (fuselage).

The wingtip shield 140 is shown as attached to the wing (airfoil) 120. However, a person of ordinary skill would understand that the wingtip shield 140 may be attached to the blades of the propeller 127 to achieve an analogous effect.

Figure 5:
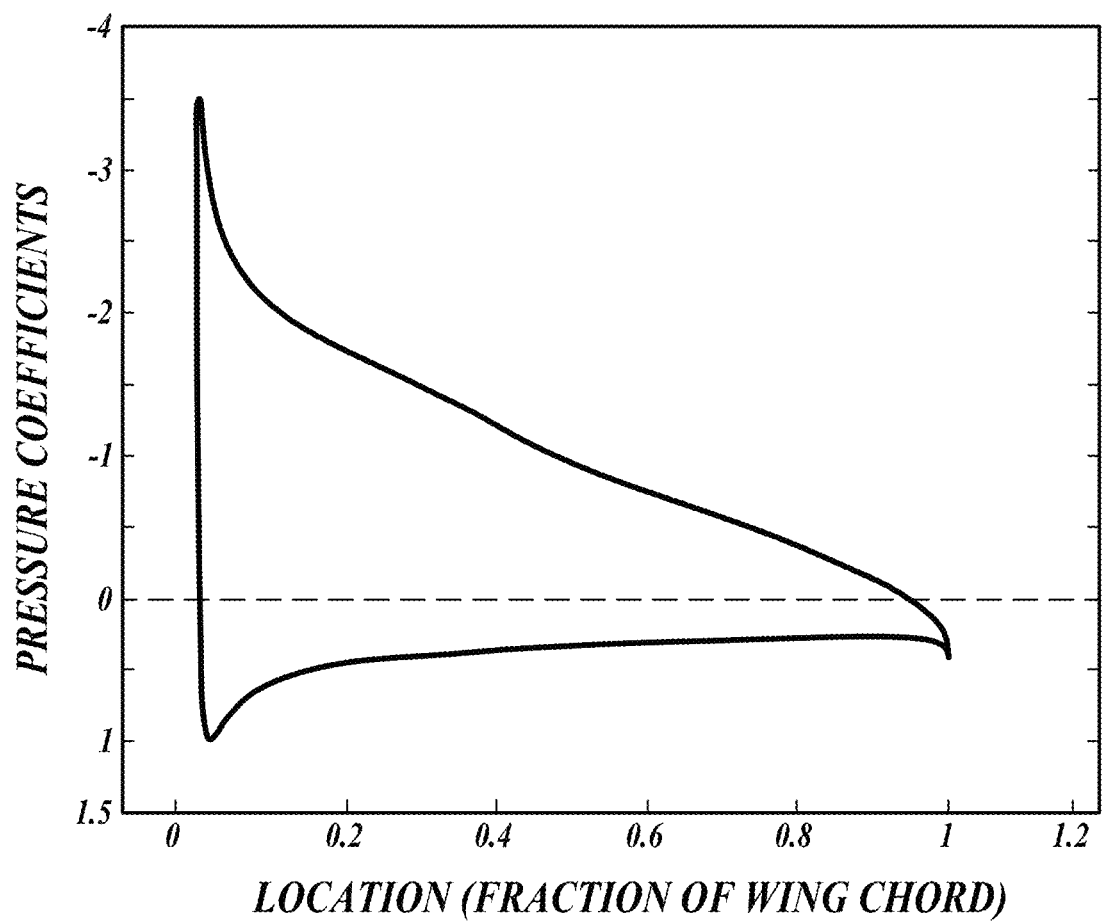
FIG. 5 is a diagram illustrating pressure distribution on an airfoil.

FIG. 5 is a diagram illustrating pressure distribution on an airfoil. The horizontal axis shows a location along the wing chord, and the vertical axis shows pressure coefficients. The upper curve, showing generally negative pressures, corresponds to the upper surface of the wing where the pressures are generally negative. The lower curve, showing generally positive pressures, corresponds to the lower surface of the wing where the pressures are generally positive, that is, higher than the static pressures of the surrounding air. The illustrated sample pressure distribution may be representative of a wing of a commercial airplane, e.g., a Boeing 737. Derivation of the lift and drag forces for an example non-limiting combination of the commercial airplane's wing and inventive wingtip shield is described with reference to FIGS. 6-7 below.

Figure 6:
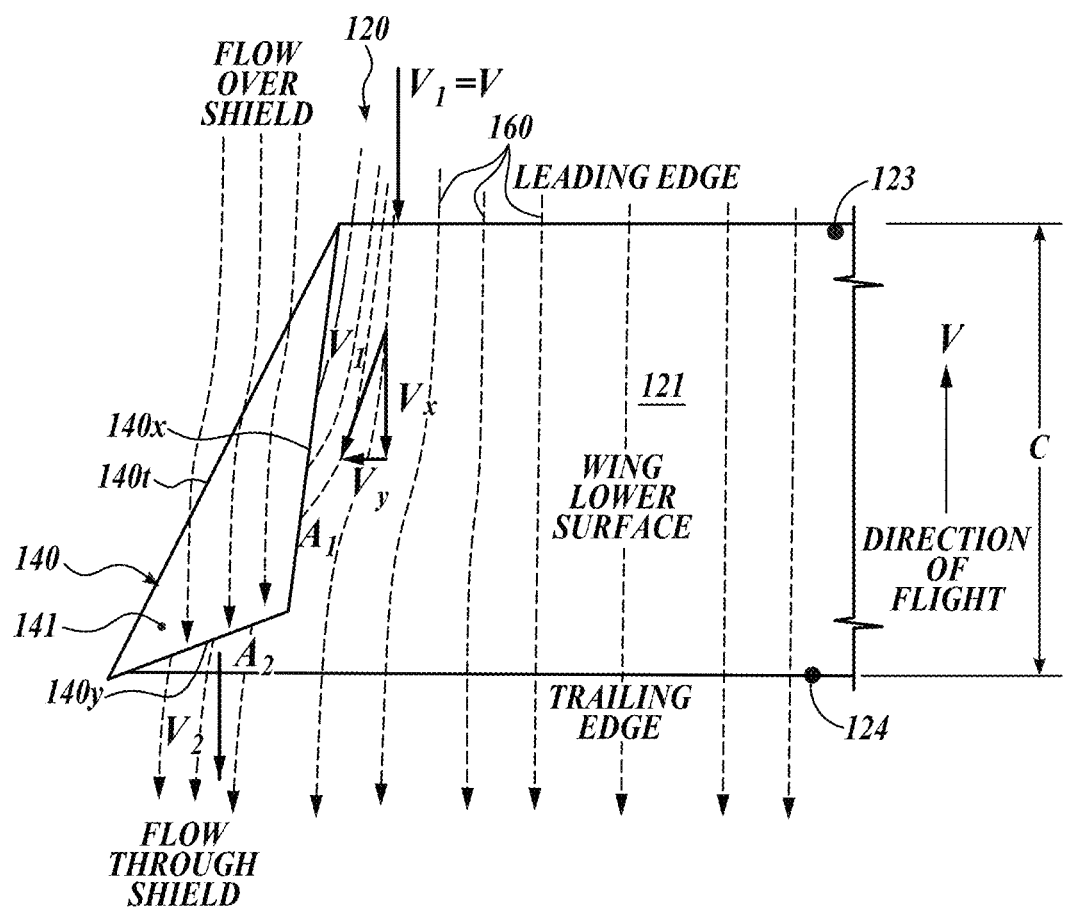
FIG. 6 illustrates velocity field over a wingtip shield in accordance with the teachings of the present disclosure.

FIG. 6 illustrates velocity field over a wingtip shield in accordance with the teachings of the present disclosure. The wing (airfoil) 120 is shown as viewed from its lower surface 121. Therefore, the flow of incoming air proceeds along a chord C from the leading edge 123 toward the trailing edge 124 at velocity V, as shown by the streamlines 160. The flow over the outer surface 141 of the wingtip structure 140 is marked as "Flow Over Shield." The flow between the wingtip shield 140 and the lower wing surface 121 is marked as "Flow Through Shield." The edges of the wingtip structure 140 are marked as 140x (in the x direction, generally corresponding to the chord or streamline direction), 140y (in the y direction, generally corresponding to the span direction of the wing) and 140t (an attachment edge between the wingtip structure and the wing). Velocity V1 can be decomposed into velocities Vx and Vy in the vicinity of the wingtip structure 140.

The space between the inner surface of the wingtip structure 140 and the wing lower surface 121 creates a "back water" space for the air flow. Because the back water region creates a low pressure region (negative dynamic pressure, $-Q$), the air that is at a higher pressure must be diverted through area A1 into the low pressure back water area (i.e., into the space between the inner surface of the wingtip structure 140 and the wing lower surface 121). The diverted air exits the space between the wingtip structure 140 and the lower surface 121 of the wing through the area A2 at velocity V2 and at negative dynamic pressure, $-Q$. This means that instead of the flow energy simply passing through the "back water" area, there is an extra amount of energy available to be converted into thrust of the wing, as further explained below. This also means the exit velocity V2 must be faster than the entry velocity V1.

The inflowing stream Vy must flow into the shield space through surface A1. Then, the flow must turn and be redirected toward the exit surface A2 at the trailing edge. By Newton's law, when a flow has velocity and directional changes, a force must be applied to the flow (and, conversely, the counter-force is applied by the flow to the structure). This force exhibits itself as an additional thrust exerted on the inner surface of the wingtip shield 140 in the direction of the flight.

Of course, the wingtip shield implementation is not without price to be paid. In particular, the wingtip shield 140 is necessarily placed into the airflow, thus incurring both an additional lift, which is generally beneficial, and an additional drag, which is generally undesired. However, because of a relatively small size of the wingtip shield 140, the additional drag can be tolerated. A sample force estimate for the wingtip shield is shown with respect to discussion of FIG. 7 below.

Figure 7:
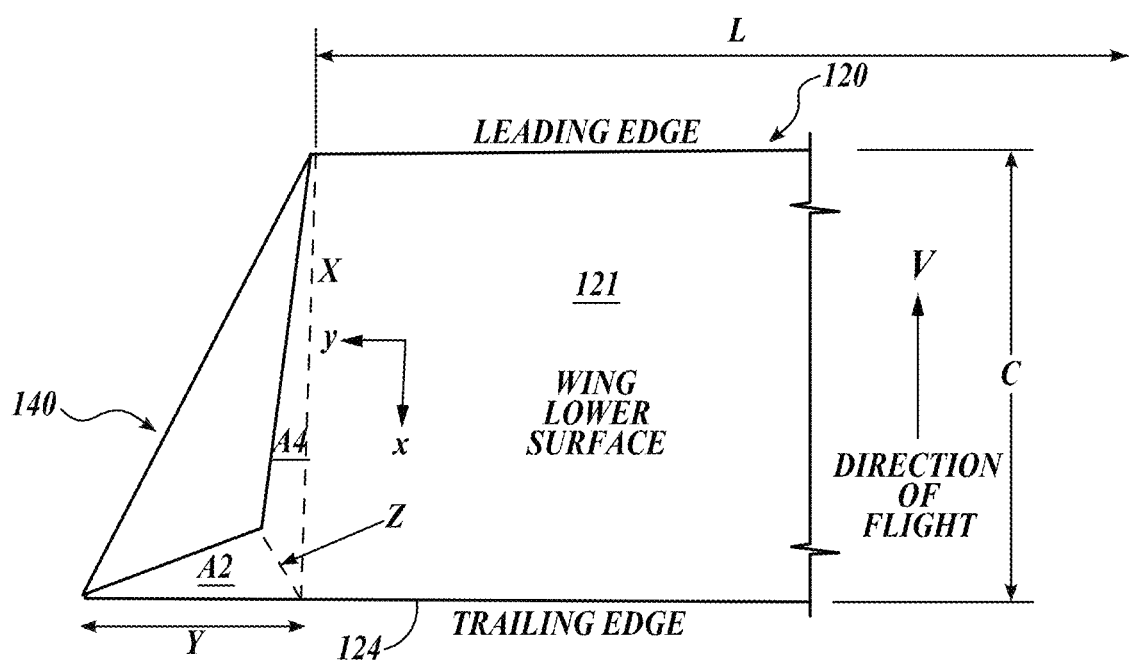
FIG. 7 schematically illustrates a wingtip shield in accordance with the teachings of the present disclosure.

FIG. 7 schematically illustrates a wingtip shield in accordance with the teachings of the present disclosure. The airfoil 120 has a length L. Air flowing on the lower wing surface has a much higher pressure than the ambient pressure. The air is therefore forced to flow into the shielded area through the side opening A1 where it is accelerated because of the low pressure behind the wingtip shield 140, as shown in detail in FIG. 6. The air flow then exits the space A2 between the wingtip shield 140 and high pressure surface 121 of the wing 120 at the trailing edge opening at a higher speed (like a jet). The changing air speed, according to Newton's Momentum Change Theory, provides a pushing force (forward thrust) to the wingtip shield and, by extension, to the wing itself. The following is an analysis of an estimated force for a representative airplane wing, which in this example case is the wing of an airplane like Boeing 737.

A set of calculation is developed for a sample and nonlimiting wingtip shield having the dimensions of: X=2 m; Y=0.7 m; and Z=0.5 m. The airplane is characterized by the following relevant parameters:

Flying weight: 80,000 kg;
Cruise velocity $V_0$=222 m/s, flying at 10,000 m;
Mach 0.8, (commercial airplane cruising speed);
Air density at 10,000 m is 0.4 kg (m)/m³
Wing area: $A_{wing}$=127 m²; Wing span 35.5 m
Average Chord=127/35.5=3.6 m (therefore, it is reasonable to assume wingtip chord at 2 m);
Wing Aspect Ratio R=10;
Engine maximum thrust: T=12,000 to 13,000 kgf per engine;
For a well-designed modern jet transport, the lift to drag ratio, L/D, is about 20;
Therefore, drag D=80,000/20=4,000 kg. About half of this drag, or 2,000 kgf is attributed to "lift induced drag; or 1,000 kgf per side of the wing due to induced drag. The other half of 2,000 kgf is the parasitic or friction drag on the surfaces of the airplane.

Under cruising conditions, the engine must overcome drag D to maintain constant speed flight. As mentioned above, the wingtip shield dimensions are:
Wing Tip Chord (dimension X in FIG. 7)=2 m,
Shield Length at trailing edge (dimension Y in FIG. 7)=0.7 m,
Shield tip to wing trailing edge (dimension Z in FIG. 7)=0.5 m The wing has a span L.
Determining Cruise Angle of Attack:

$$Q = \frac{1}{2}\rho V_1^2 = 0.5 \times .4 \times 222^2 = 9,856 \text{ or approximately } 10,000$$

Evaluate Angle of Attack $\alpha$ for AR=10, lift coefficient slope $CL\alpha$=6.0 (based on experimental data)

$$\text{Airplane Mass in kg} = A_{wing}(C_{L\alpha}\sin\alpha)\left(\frac{1}{2}\rho V_1^2\right)$$

$$80,000 \times 9.8 = 127(6.0 \times \sin\alpha) \times 10,000$$

$$\sin\alpha = 80,000 \times 9.8/(127 \times 6 \times 10,000) = 0.103$$

$$\alpha = 6 \text{ degrees}$$

Determination Forces on Wingtip Shield

The following verification is performed by an air flow simulation tool AJ Designer. A person of ordinary skill would know that analogous verification can be performed by other available simulation tools.

$$\text{Input:} C_L = C_{L\alpha}\sin\alpha = 0.627,$$

$$A = 127, \text{ Air Density } \rho = 0.4, V = 222,$$

Lift force =

$$A_{wing}(C_{L\alpha}\sin\alpha)\left(\frac{1}{2}\rho V_1^2\right) = \left(\frac{1}{2}\right) * 0.627 * 127 * 0.4 * 222^2 = 80,090 \text{ kgf}$$

Evaluate Shield Thrust Force based on Bernoulli's Law:

$$P_1 + \frac{1}{2}\rho V_1^2 = P_2 + \frac{1}{2}\rho V_2^2 \quad \text{Eq. (1)}$$

Using Eq. (1), and assuming no loss in energy, $V_1$=222 m/s.

$P_2$ should be $P_1-Q$, where $P_1$ is ambient pressure. Therefore:

$$P_1 + \frac{1}{2}\rho V_1^2 = (P_1 - Q) + \frac{1}{2}\rho V_2^2$$

-continued $$\frac{1}{2}\rho V_2^2 = Q + \frac{1}{2}\rho V_1^2$$

$$V_2^2 = \frac{2Q}{\rho} + V_1^2 = 50{,}000 + 49{,}284 = 99{,}284$$

$$V_2 = 315 \text{ m/s}$$

Next, based on the Continuity Equation:

$$A_1 V_1 = A_2 V_2 \qquad \text{Eq. (2)}$$

It follows that:

$$A_1 V_y = A_2 V_2$$

Therefore:

$$(2 \times 0.5/2) \times V_y = (0.7 \times 0.5/2) \times 315$$

$$V_y = 110 \text{ m/s}$$

Based on the vector decomposition:

$$V_1^2 = V_x^2 + V_y^2$$

$$V_x^2 = V_1^2 - V_y^2 = 222^2 - 110^2$$

$$v_x = 193 \text{ m/s}$$

We can now estimate force on a pipe bend:

$$F_2 = -P_2 A_2 + (V_2 - V_x) \times (\rho A_2 V_2) \qquad \text{Eq. (3)}$$

$$F_2 = 2 \times (-P_2 A_2 + (V2 - V1)\rho V_2 A_2)$$

$$= 2 \times (-Q \times A_2 + (V_2 - V_1) \times (\rho A_2 V_2))$$

$$= 2(-10{,}000 \times 0.175 + (315 - 193) \times (0.4 \times 0.175 \times 315))$$

$$= 2 \times (-1{,}750 + 2{,}690) = 5{,}380 - 3{,}500 = 1{,}800 N = 192 \text{ kgf}$$

The value of 192 kgf represents a net thrust force applied to the shield.

In the context of the above estimates, the negative value of the $P_2 A_2$ force implies that the full effect of the vacuum state at the exit port $A_2$ has been taken into account, which replaces the effect of the induced drag force. Therefore, the common induced drag is no longer present in light of the wingtip shield installation, the common induced drag having been replaced by the negative value of the $P_2 A_2$ force.

The following evaluates the factual aerodynamic force applied to the shield plate itself.

Evaluating Wingtip Shield Vortex Force (Lift and Drag)

Figure 8:
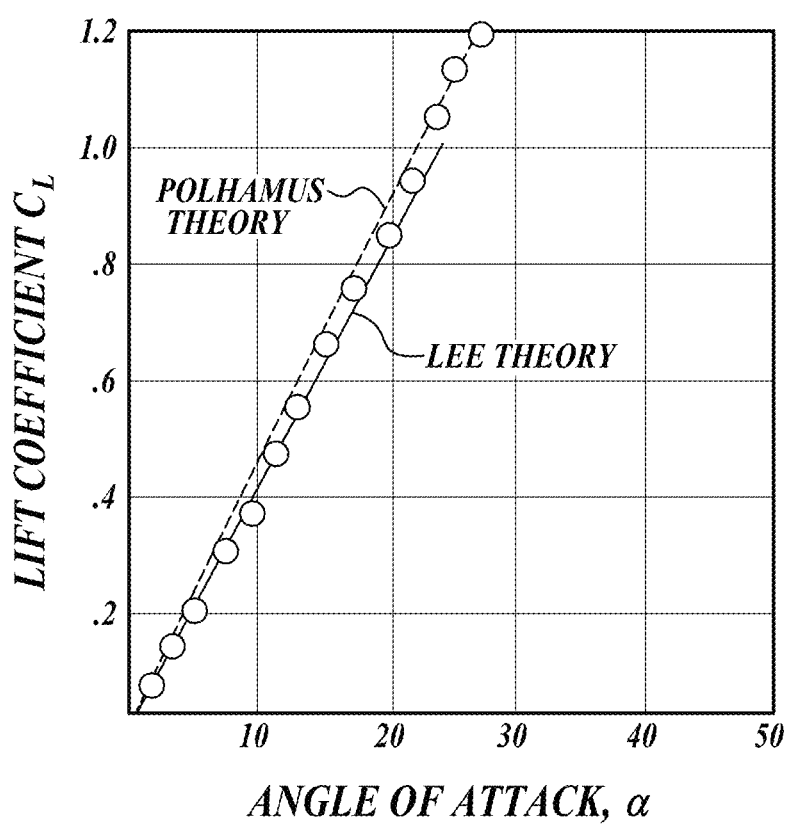
FIG. 8 is a graph of lift coefficient distribution on an airfoil.

FIG. 8 is a graph of lift coefficient distribution on an airfoil. The horizontal axis shows the angle of attack of the aircraft (i.e., the angle of the attack of the wing). The vertical axis shows the lift coefficient (CL). The three sets of data correspond to Polhamus Theory (dash line), Lee's (the author's) Theory (solid line), and Wentz experimental data (open symbols). The results correspond to a 70 degree sweep back delta wing with an aspect ratio of 1.46.

The following calculations are based on Delta Wing Theory that was authored by the inventor. For the geometry shown in FIG. 7, the Delta Wing Theory produces the estimates shown in FIG. 8.

The following analysis is based on the experimental results of a 70 degree sweep back delta wing, which is approximately equivalent to the current shield design.

TABLE 1

Aerodynamic Estimates by Delta Wing Theory
(Delta Wing Theory, Lee theoretical values)

| Alpha | Lift | Drag |
|---|---|---|
| 5 | 0.20 | 0.017 |
| 10 | 0.40 | 0.07 |
| 15 | 0.623 | 0.17 |
| 20 | 0.84 | 0.30 |
| 30 | 1.22 | 0.71 |

Aerodynamic Forces on Wingtip Shield

Assuming the base wing angle of attack to be α=6 degrees the shield plate angle of attack is α=6+14=20 degrees, referring to Table 1, we get:

$$C_L = 0.84, C_D = 0.30$$

A person of ordinary skill would recognize that the above lift coefficient CL and drag coefficient $C_D$ are in line with the available experimental data (e.g., experimental data by Wentz). Therefore, lift force L and drag force D for the wingtip shield in FIG. 7 are:

$$L = \frac{2 \times 0.84 \times (0.7 \times 2)}{2} \times 10{,}000 = 11{,}760 \ N = 1{,}200 \text{ kgf}$$

$$D = 2 \times \frac{0.30 \times (0.7 \times 2)}{2} \times 10{,}000 = 4{,}200 \ N = (-)429 \text{ kgf}$$

Total Net Force

Improvement caused by the wingtip shield forces (net improvement):

Gain in lift force:

$$L_{extra} = 1{,}200 \text{ kgf}$$

The delta wing drag force is already accounted for by the $A_2$ area negative pressure drag described earlier.

If instead we use the delta wing drag force applied to the wing shield as a more conservative calculation, the force balance becomes, $$5{,}380 - 4200 = 1{,}180 \ N = 120 \text{ kgf}$$

This means that using the realistic aerodynamic force for the evaluation, there is still a net thrust force on the shield. Using the conservation thrust value, the total drag of the airplane becomes $$-2{,}000 + 120 = -1{,}800 \; kgf$$

Conclusion

The inventive technology changes in the aerodynamic behavior at the wingtip: instead of the common wingtip trailing vortices, the air is redirected by the wingtip shield to flow accelerated in the downstream direction. Because of this significant change, the (vortex) induced drag disappears, contrarily, the change of air flow direction provides a positive thrust to the wing thus the net drag is significantly reduced. This means that the original total airplane drag of 4000 kgf is reduced to 1880 kgf, for a 53% total reduction. Or, in terms of the lift to drag ratio, this ratio is changed to 42 in place of 20. This improvement can change the economics of flight significantly as well as reducing the pollution caused by conventional fossil fuel burning engines.

Figure 9:
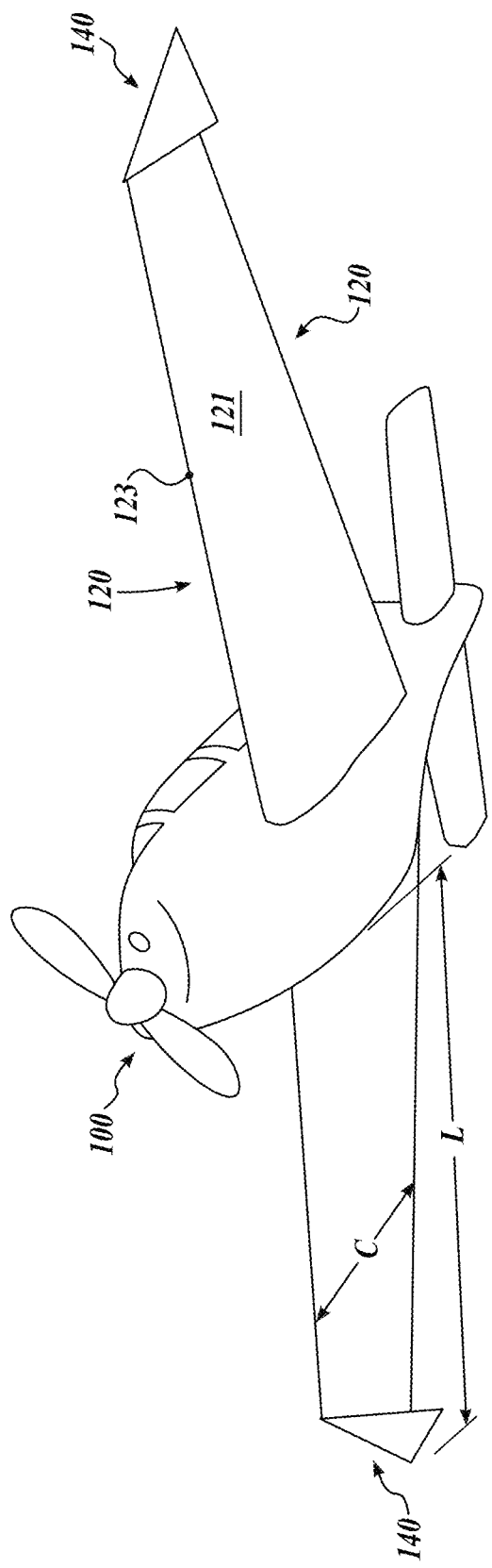
FIG. 9 illustrates an aircraft having wingtip shields in accordance with the teachings of the present disclosure.
Figure 10:
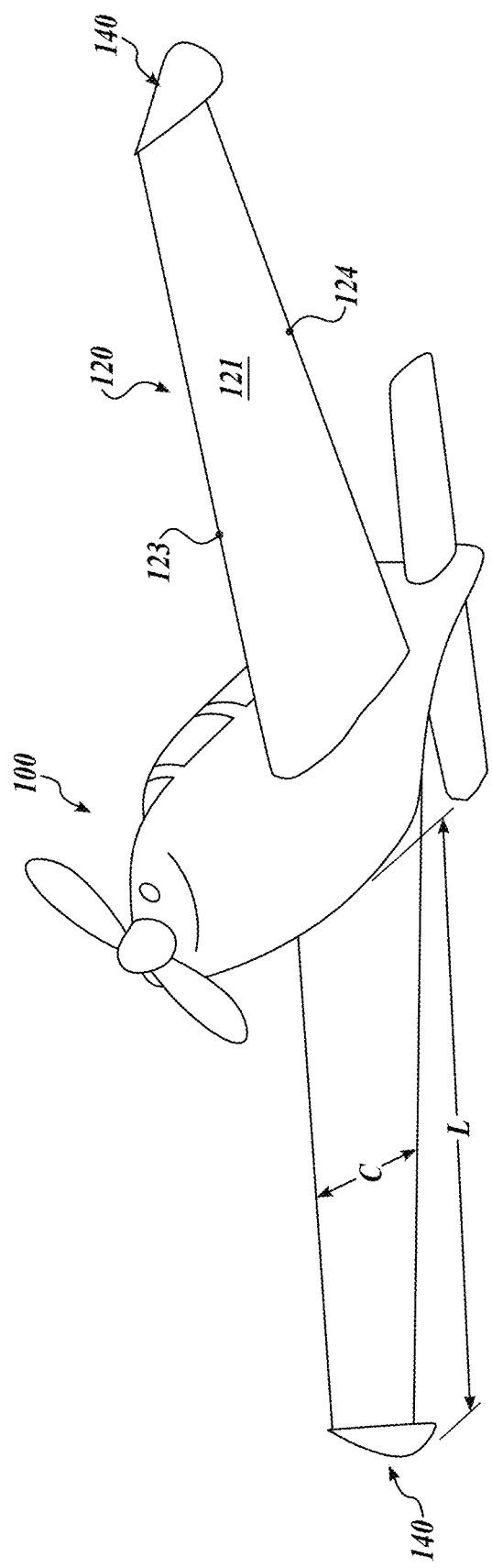
FIG. 10 illustrates an aircraft having wingtip shields in accordance with the teachings of the present disclosure.

FIGS. 9 and 10 illustrate aircrafts having wingtip shields in accordance with the teachings of the present disclosure. In particular, FIG. 9 illustrates the wingtip structure 140 having a simple delta shape facing the high pressure surface 121 of the wing (airfoil) 120. The illustrated simple delta shape (simple, flat triangle shape) may be advantageous from the manufacturing point of view, however, such shape may also result in a less than optimal aerodynamic properties of the wingtip shield 140. FIG. 10 illustrates a streamlined wingtip shield. Generally, such a streamlined wingtip shield 140 results in further reduction in the drag force, while maintaining the improvements in the lift force and thrust force associated as explained above.

Embodiment B—Reverse Wingtip Shield

Figure 11:
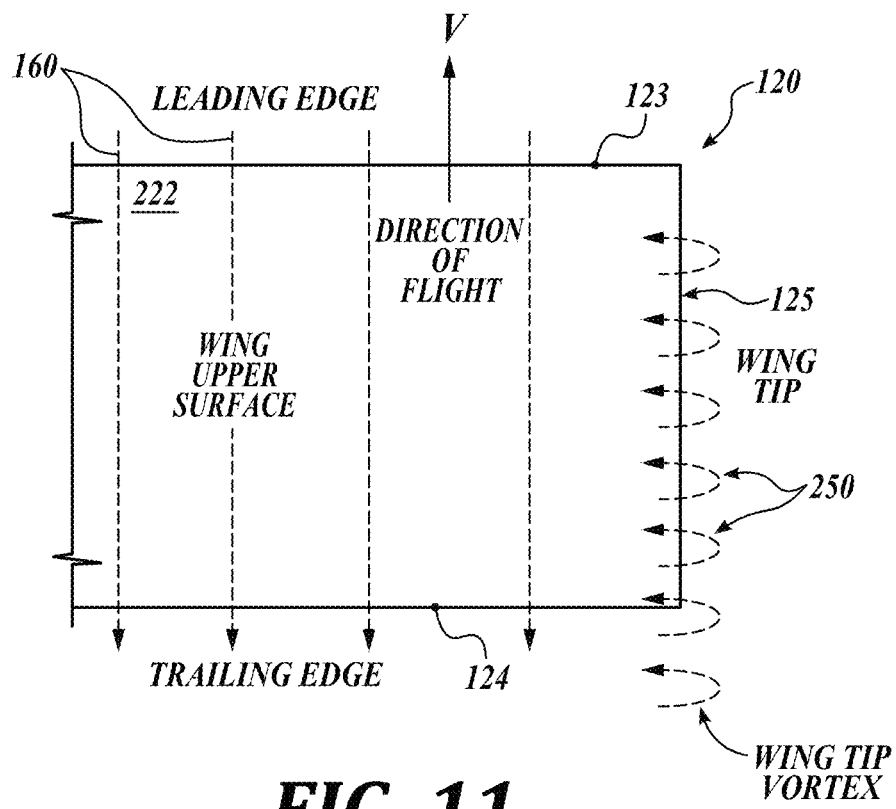
FIG. 11 is a diagram illustrating wing tip vortex of an airfoil.

FIG. 11 is a diagram illustrating wing tip vortex of an airfoil. The wing 120 is viewed from the upper side (low pressure side) 222 of the wing. The pressure at the lower side (high pressure side) of the wing is significantly higher, causing the air near the wingtip 125 to flow from the lower side (high pressure side) to the upper side (low pressure side), thereby creating a clockwise vortex flow (trailing vortices) 250. As explained above, this phenomenon requires a continuous expenditure of energy into the stream. Some embodiments of the reverse wingtip shield that reduce this problem are described with reference to FIGS. 12-14 below.

Figure 12:
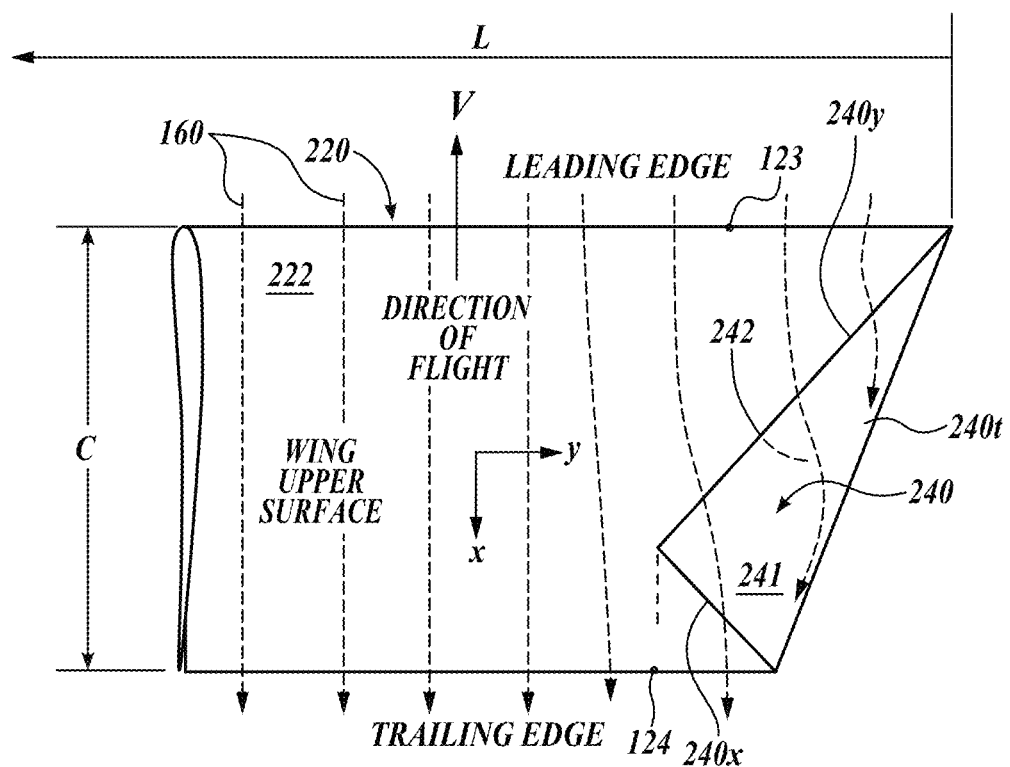
FIG. 12 illustrates velocity field of an airfoil having a reverse wingtip shield in accordance with the teachings of the present disclosure.

FIG. 12 illustrates velocity field of an airfoil having a reverse wingtip shield in accordance with the teachings of the present disclosure. In contrast with the wingtip shield of embodiment A, the illustrated reverse wingtip shield 240 is positioned on the upper wing surface (low pressure surface) 222. The reverse wingtip shield 240 is oriented in such a way that its inner (bottom) surface 242 faces the top surface 222 of the wing, as well as the incoming free stream air flow. The outer surface 241 of the reverse wingtip shield 240 faces away from the top surface 222 of the wing 220. The illustrated reverse wingtip shield 240 is shaped as a simple delta wing having edges 240x and 240y, however, in other embodiments, the reverse wingtip shield 240 may be aerodynamically shaped. The connecting line 240t to the wing tip is swept inboard starting from the leading edge 123 of the wing tip, thus intentionally creating an adverse flow field on the shield, thereby foregoing the thrust/lift/drag benefits of the wingtip shield of embodiment A.

One benefit of the above orientation and placement of the reverse wingtip shield 240 is a way that a strong vortex is generated by the top edge 240y of the reverse wingtip shield 240. This vortex or vortex filament is explained with reference to FIG. 13 below.

Figure 13:
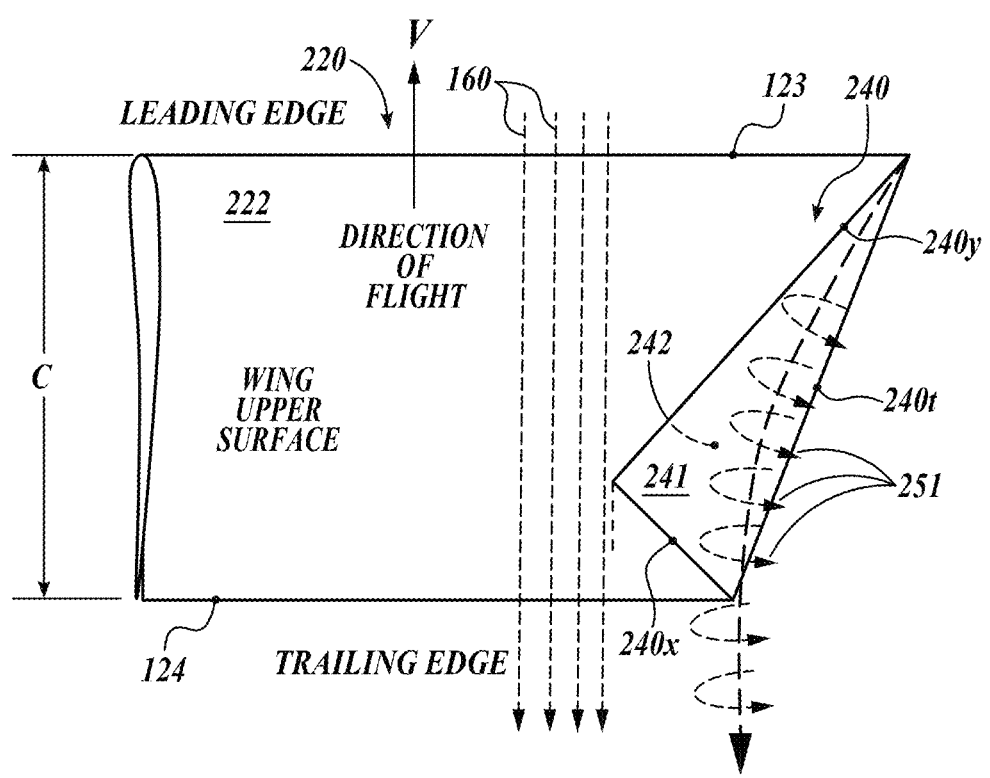
FIG. 13 illustrates vortices generated on an airfoil having a reverse wingtip shield in accordance with the teachings of the present disclosure.

FIG. 13 illustrates vortices generated on an airfoil 220 having a reverse wingtip shield 240 in accordance with the teachings of the present disclosure. Because of the orientation of the reverse wingtip shield 240, the vortices 251 rotate in the opposite direction as compared to the traditional wing without the reverse wingtip shield as shown in FIG. 10. In particular, clockwise vortices are generated by the reverse wingtip shield 240, thus the vortices rotate in a direction from the upper surface (low pressure surface) 222 of the airfoil 220, about the wingtip edge of the airfoil, and toward the lower surface (high pressure surface) of the airfoil 220. Therefore, vortices 251 rotate clockwise when viewed from the trailing edge of the airfoil 220. This direction of vortex rotation is opposite from the one that is normally generated from the lower surface (high pressure surface) of the airfoil, about the wingtip edge of the airfoil, and toward the upper surface (low pressure surface) 222 of the airfoil, which is a counter-clockwise direction when viewed from the trailing edge. This reversion in vortex rotation is affected by the reverse wingtip shield 240 and may have significant consequences on the wing operation, especially in case of rotating airfoils, as explained with reference to FIG. 14 below.

Figure 14:
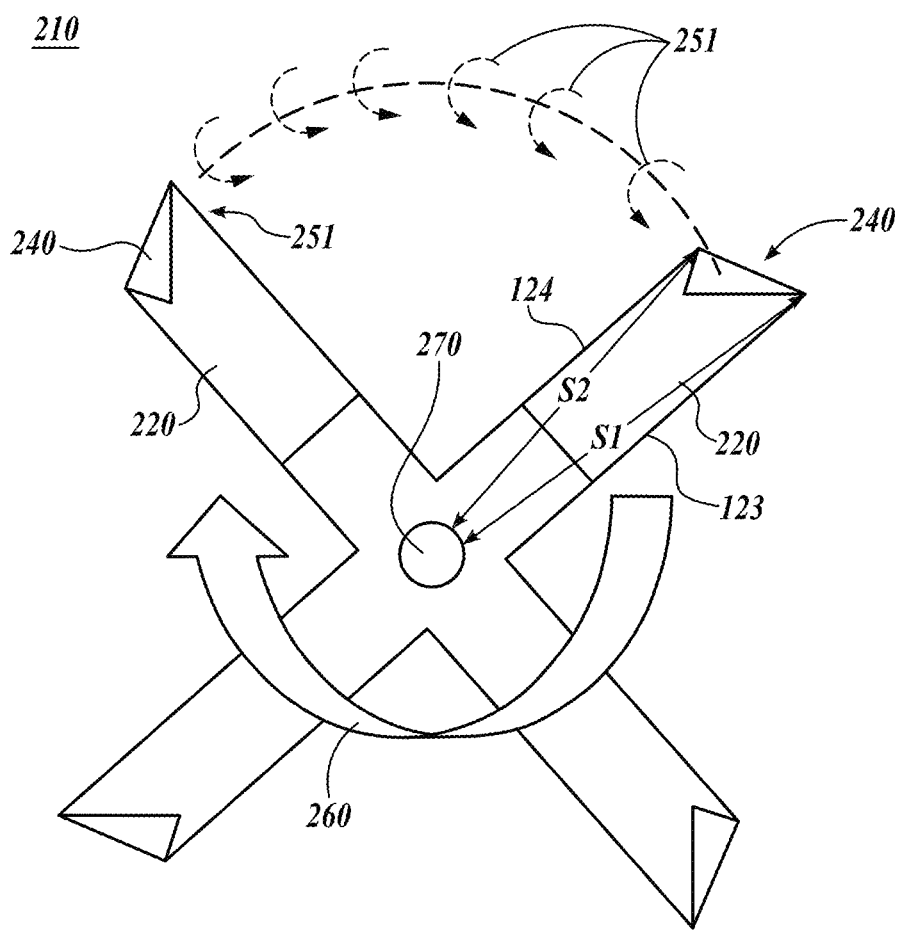
FIG. 14 illustrates operation of rotating airfoils having a reverse wingtip shield in accordance with the teachings of the present disclosure.

FIG. 14 illustrates operation of rotating airfoils 220 having a reverse wingtip shield 240 in accordance with the teachings of the present disclosure. For example, the illustrated set 210 of airfoils 220 may represent a turbine, a fan, a boat propeller, or rotor blades of a helicopter or a gyrocopter, etc. The direction of rotation is marked by the arrow 260 about a hub 270. A simple flat, delta reverse wingtip shield is illustrated, however, the embodiments that include curved reverse wingtip shields 240 are also encompassed. Looking at the attachment of the reverse wingtip shield 240 to the airfoil 220, the attachment of the wingtip shield 240 to the airfoil 220 may be described as extending from along a peripheral edge of the airfoil from a first point 131 of a leading edge 123 of the airfoil to a second point 132 of a trailing edge 124 of the airfoil, where a first span distance S1 from the first point 131 at the leading edge 123 to the main body (hub 270) is greater than a second span distance S2 of the second point 132 at the trailing edge 124 to the main body (hub 270).

Clockwise vortices 251 are generated by the reverse wingtip shield 240 that is placed at the wingtip edge of the airfoils 220. In operation, the trailing airfoil 220 travels into the vortices created by the leading reverse wingtip shield 240. The vortices 251 rotate in the clockwise direction, therefore creating an updraft wind to the trailing airfoil 220. As a result, the trailing airfoil 220 benefits from the vortex by gaining a forward thrust on it, just like an airplane flying into the wake vortex of a leading airplane in military formation flight for long distance missions. This forward thrust can compensate the drag loss caused by the leading reverse wingtip shield 240, resulting in increased thrust for, for example, turbine or the helicopter or gyrocopter rotor.

Although the present invention is defined in the claims, it should be understood that the present invention can alternatively be defined in accordance with the following examples:

Example 1. A wingtip shield, comprising:
an inner surface facing a high-pressure side of an airfoil, wherein the airfoil is attached to a main body; and an outer surface configured opposite from the inner surface;

wherein the wingtip shield is attachable to the airfoil along a peripheral edge of the airfoil from a first point of a leading edge of the airfoil to a second point of a trailing edge of the airfoil, and wherein a first span distance from the first point at the leading edge to the main body is less than a second span distance of the second point at the trailing edge to the main body.

Example 2. The wingtip shield of example 1, wherein the airfoil is a wing of an airplane, and the main body is a fuselage of an aircraft.

Example 3. The wingtip shield of example 1, wherein the airfoil is a blade of boat propeller and the main body is a shaft of the boat propeller.

Example 4. The wingtip shield of example 1, wherein the airfoil is a blade of an airplane propeller, and the main body is a shaft of the propeller.

Example 5. The wingtip shield of example 1, wherein the airfoil is a blade of a helicopter or a gyrocopter, and wherein the main body is a shaft of the helicopter or the gyrocopter.

Example 6 The wingtip shield of example 1, wherein the airfoil is a blade of a wind turbine, and the main body is a shaft of the wind turbine.

Example 7. The wingtip shield of example 1, wherein the inner surface and the outer surface are generally flat.

Example 8. The wingtip shield of example 1, wherein the inner surface and the outer surface are curved.

Example 9. The wingtip shield of example 1, wherein the wingtip shield is removably attached to the airfoil.

Example 10. The wingtip shield of example 1, wherein the wingtip shield is fixedly attached to the airfoil.

Example 11. The wingtip shield of example 1, wherein:
a fluid flow from the leading edge accelerates when entering a space between the inner surface of the wingtip shield and the high-pressure side of the airfoil,
the fluid flow undergoes a change in direction when flowing in the space between the inner surface of the wingtip shield and the high-pressure side of the airfoil, and
the change in direction of the fluid flow causes a change of a fluid flow momentum and a forward force directed toward the leading edge of the airfoil, wherein the shield is configured for absorbing a forward force.

Example 12. A reverse wingtip shield, comprising:
an inner surface facing a low-pressure side of an airfoil, wherein the airfoil is attached to a main body; and
an outer surface configured opposite from the inner surface;
wherein the reverse wingtip shield is attachable to the airfoil along a peripheral edge of the airfoil from a first point of a leading edge of the airfoil to a second point of a trailing edge of the airfoil, and wherein a first span distance from the first point at the leading edge to the main body is greater than a second span distance of the second point at the trailing edge to the main body.

Example 13. The reverse wingtip shield of example 12, wherein the airfoil is a blade of a wind turbine, and the main body is a hub of the wind turbine.

Example 14. The reverse wingtip shield of example 12, wherein the airfoil is a blade of a boat propeller, and the main body is a shaft of the boat propeller.

Example 15. The reverse wingtip shield of example 12, wherein the airfoil is a blade of a helicopter propeller, and the main body is a shaft of the helicopter propeller.

Example 16. The reverse wingtip shield of example 12, wherein the inner surface and the outer surface are generally flat.

Example 17. The reverse wingtip shield of example 12, wherein the inner surface and the outer surface are generally curved.

Example 18. The reverse wingtip shield of example 12, wherein the wingtip shield is removably attached to the airfoil.

Example 19. The reverse wingtip shield of example 12, wherein the wingtip shield is fixedly attached to the airfoil.

Example 20. The reverse wingtip shield of example 12, wherein the airfoil is a leading rotating airfoil, wherein, in operation, fluid flow vortices separate from the leading rotating airfoil, and wherein the fluid flow vortices interact with a trailing rotating airfoil.

Example 21. The reverse wingtip shield of example 20, wherein the fluid flow vortices generate a updraft wind on the trailing rotating airfoil, and wherein the updraft wind generates a forward thrust on the trailing rotating airfoil.

Numerous specific details are set forth above in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention. For example, skilled artisans will appreciate that elements in the previously described figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in the figures in order to facilitate a less obstructed view of these various embodiments of the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In the context of this specification, terms about, approximately, substantively and similar are to be interpreted as within +/−5% of the stated value.

The description of illustrated examples of the present invention, including what is described in the Abstract, are not intended to be exhaustive or to be a limitation to the precise forms disclosed. While specific embodiments of, and examples for, the invention are described herein for illustrative purposes, various equivalent modifications are possible without departing from the broader spirit and scope of the present invention. Indeed, it is appreciated that any specific example values, times, etc., are provided for explanation purposes and that other values may also be employed in other embodiments and examples in accordance with the teachings of the present invention.

What is claimed is:

1. An aircraft structure, comprising:
an airfoil having a high-pressure side and a low-pressure side, wherein the airfoil is configured for attaching to a main body; and
a reverse wingtip shield having an inner surface and an outer surface opposite from the inner surface, the inner surface configured for facing the low-pressure side of the airfoil, wherein the inner surface is configured for facing towards and extending over the low-pressure side of the airfoil such that the inner surface orthogonally projects over the low-pressure side of the airfoil, and wherein, when viewed from the low-pressure side of the airfoil, the wingtip shield is shaped as a generally triangular shape having two edges that meet in a point projecting over the low-pressure side of the airfoil;
wherein the reverse wingtip shield is attachable to the airfoil along a peripheral edge of the airfoil from a first point of a leading edge of the airfoil to a second point of a trailing edge of the airfoil, and wherein a first span distance from the first point at the leading edge to the main body is greater than a second span distance of the second point at the trailing edge to the main body.

2. The aircraft structure of claim 1,
wherein the airfoil is a blade of a wind turbine, and the main body is a hub of the wind turbine.

3. The aircraft structure of claim 1,
wherein the airfoil is a blade of a boat propeller, and the main body is a shaft of the boat propeller.

4. The aircraft structure of claim 1,
wherein the airfoil is a blade of a helicopter propeller, and the main body is a shaft of the helicopter propeller.

5. The aircraft structure of claim 1,
wherein the inner surface and the outer surface are generally flat.

6. The aircraft structure of claim 1,
wherein the inner surface and the outer surface are generally curved.

7. The aircraft structure of claim 1,
wherein the wingtip shield is fixedly attached to the airfoil.

8. The aircraft structure of claim 1,
wherein the airfoil is a leading rotating airfoil, wherein, in operation, fluid flow vortices separate from the leading rotating airfoil, and wherein the fluid flow vortices interact with a trailing rotating airfoil.

9. The aircraft structure of claim 8,
wherein the fluid flow vortices generate an updraft wind on the trailing rotating airfoil, and wherein the updraft wind generates a forward thrust on the trailing rotating airfoil.

* * * * *